US012618742B2

(12) United States Patent
Rudd et al.

(10) Patent No.: US 12,618,742 B2
(45) **Date of Patent: *May 5, 2026**

(54) PERIODIC WATER LEAK DETECTION

(71) Applicant: Alarm.com Incorporated, Tysons, VA (US)

(72) Inventors: Grant Rudd, Braintree, MA (US); Robert Nathan Picardi, Herndon, VA (US); Daniel Marc Goodman, Needham, MA (US); Craig Carl Heffernan, Oregon City, OR (US); Harrison Wayne Donahue, Attleboro, MA (US); Liam Shea Daly, Needham, MA (US); Marc Anthony Epard, Lawrence, KS (US)

(73) Assignee: Alarm.com Incorporated, Tysons, VA (US)

( * ) Notice: Subject to any disclaimer, the term of this patent is extended or adjusted under 35 U.S.C. 154(b) by 317 days.

This patent is subject to a terminal disclaimer.

(21) Appl. No.: 18/369,244

(22) Filed: Sep. 18, 2023

(65) Prior Publication Data

US 2024/0003774 A1     Jan. 4, 2024

Related U.S. Application Data

(63) Continuation of application No. 17/398,214, filed on Aug. 10, 2021, now Pat. No. 11,788,920.

(Continued)

(51) Int. Cl.
*G01M 3/26* (2006.01)
*F17D 5/02* (2006.01)

(52) U.S. Cl.
CPC .................................... *G01M 3/26* (2013.01)

(58) Field of Classification Search
CPC ...... G01M 3/00; G01M 3/02; G01M 3/26–32; F17D 5/00; F17D 5/02
See application file for complete search history.

(56) References Cited

U.S. PATENT DOCUMENTS 8,457,908 B2 *   6/2013   Patel ..................... G01F 15/066
                                                        702/50
9,939,299 B2     4/2018   Patel
                        (Continued)

FOREIGN PATENT DOCUMENTS

BR        PI1101199        10/2012
DE        102019104236     8/2020
                        (Continued)

OTHER PUBLICATIONS

PCT International Search Report in International Appln. No. PCT/US2021/045329, dated Nov. 17, 2021, 10 pages.

(Continued)

*Primary Examiner* — Nguyen Q. Ha
(74) *Attorney, Agent, or Firm* — Fish & Richardson P.C.

(57)                     ABSTRACT

Methods, systems, and apparatus for periodic water leak detection are disclosed. A method includes obtaining, using a water meter, water meter data representing the occurrence of water usage events at a property; determining, based on the water meter data, a periodicity of water usage events; determining that the periodicity of water usage events satisfies water leak criteria; and based on determining that the periodicity of water usage events satisfies water leak criteria, determining that a water leak exists at the property. Determining the periodicity of water usage events can include determining an average time between a start of sequential water usage events; and determining that the periodicity of water usage events satisfies water leak criteria can include determining that the average time between the start of (Continued)

sequential water usage events is less than a threshold time between the start of sequential water usage events.

20 Claims, 5 Drawing Sheets

Related U.S. Application Data

(60) Provisional application No. 63/065,025, filed on Aug. 13, 2020.

(56) References Cited

U.S. PATENT DOCUMENTS

| | | | |
|---|---|---|---|
| 9,939,344 | B2 | 4/2018 | Bracken et al. |
| 10,410,501 | B2 | 9/2019 | Klicpera |
| 10,782,204 | B2 | 9/2020 | Picardi et al. |
| 10,822,251 | B1 | 11/2020 | Chandler, Jr. et al. |
| 10,837,160 | B2 | 11/2020 | Hammond et al. |
| 10,921,288 | B2 | 2/2021 | Nielsen et al. |
| 11,473,995 | B2 | 10/2022 | Rasmussen et al. |
| 11,493,371 | B2 | 11/2022 | Patel et al. |
| 11,530,531 | B2 | 12/2022 | Poojary et al. |
| 11,548,795 | B1 | 1/2023 | Chandler, Jr. et al. |
| 11,549,837 | B2 | 1/2023 | Klicpera |
| 11,630,021 | B2 | 4/2023 | Fleury, Jr. et al. |
| 2006/0047452 | A1 | 3/2006 | Shim et al. |
| 2006/0137090 | A1 | 6/2006 | Jeffries et al. |
| 2010/0204839 | A1 | 8/2010 | Behm et al. |
| 2012/0026004 | A1 | 2/2012 | Broniak et al. |
| 2014/0069207 | A1 | 3/2014 | Leaders et al. |
| 2016/0335875 | A1 | 11/2016 | Alcorn et al. |
| 2016/0349140 | A1 | 12/2016 | Teymouri |
| 2017/0003693 | A1 | 1/2017 | Baxter |
| 2017/0131174 | A1 | 5/2017 | Enev et al. |
| 2017/0197854 | A1 | 7/2017 | Chandler, Jr. et al. |
| 2017/0292893 | A1 | 10/2017 | Bunker et al. |
| 2018/0045599 | A1 | 2/2018 | Larach |
| 2018/0224349 | A1 | 8/2018 | Fleury, Jr. et al. |
| 2019/0025150 | A1 | 1/2019 | Picardi et al. |
| 2020/0018664 | A1 | 1/2020 | Bunker et al. |
| 2020/0080877 | A1 | 3/2020 | Foss et al. |
| 2020/0103306 | A1 | 4/2020 | Mine et al. |
| 2020/0141775 | A1 | 5/2020 | Muir |
| 2020/0378860 | A1 | 12/2020 | Picardi et al. |
| 2021/0215569 | A1 | 7/2021 | Enev et al. |
| 2022/0403951 | A1 | 12/2022 | Greenboim |
| 2022/0404227 | A1 | 12/2022 | Greenboim |
| 2023/0003605 | A1 | 1/2023 | Rasmussen et al. |

FOREIGN PATENT DOCUMENTS

| | | |
|---|---|---|
| JP | H0464787 | 2/1992 |
| JP | 08261805 | 10/1996 |
| WO | WO 2007/032044 | 3/2007 |
| WO | WO 2016/161389 | 10/2016 |
| WO | WO 2017/150263 | 9/2017 |
| WO | WO 2018/068097 | 4/2018 |
| WO | WO 2021/069633 | 4/2021 |

OTHER PUBLICATIONS

PCT International Search Report in International Appln. No. PCT/US2018/043328, dated Dec. 19, 2018, 14 pages.

* cited by examiner

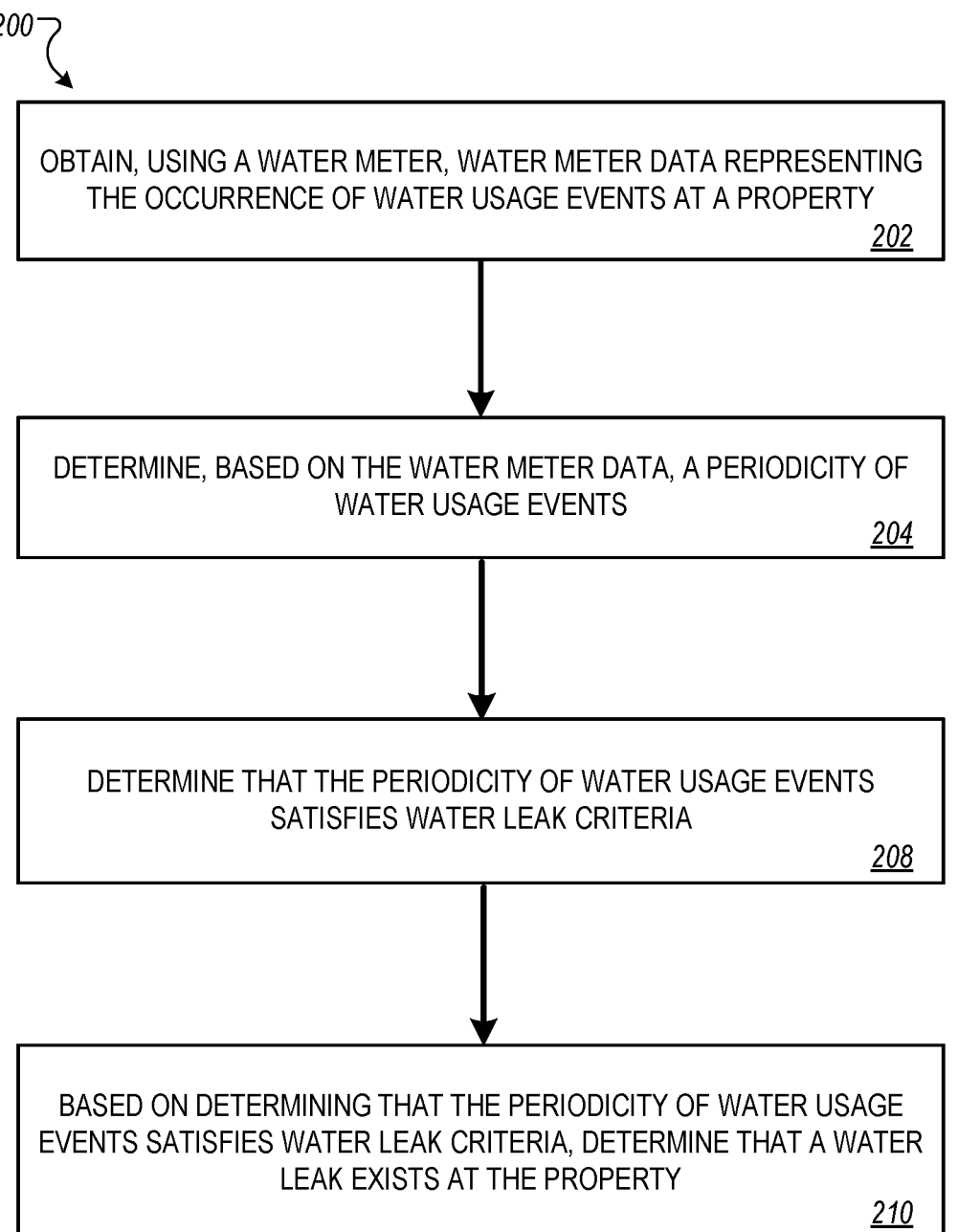

*200*

OBTAIN, USING A WATER METER, WATER METER DATA REPRESENTING THE OCCURRENCE OF WATER USAGE EVENTS AT A PROPERTY

*202*

DETERMINE, BASED ON THE WATER METER DATA, A PERIODICITY OF WATER USAGE EVENTS

*204*

DETERMINE THAT THE PERIODICITY OF WATER USAGE EVENTS SATISFIES WATER LEAK CRITERIA

*208*

BASED ON DETERMINING THAT THE PERIODICITY OF WATER USAGE EVENTS SATISFIES WATER LEAK CRITERIA, DETERMINE THAT A WATER LEAK EXISTS AT THE PROPERTY

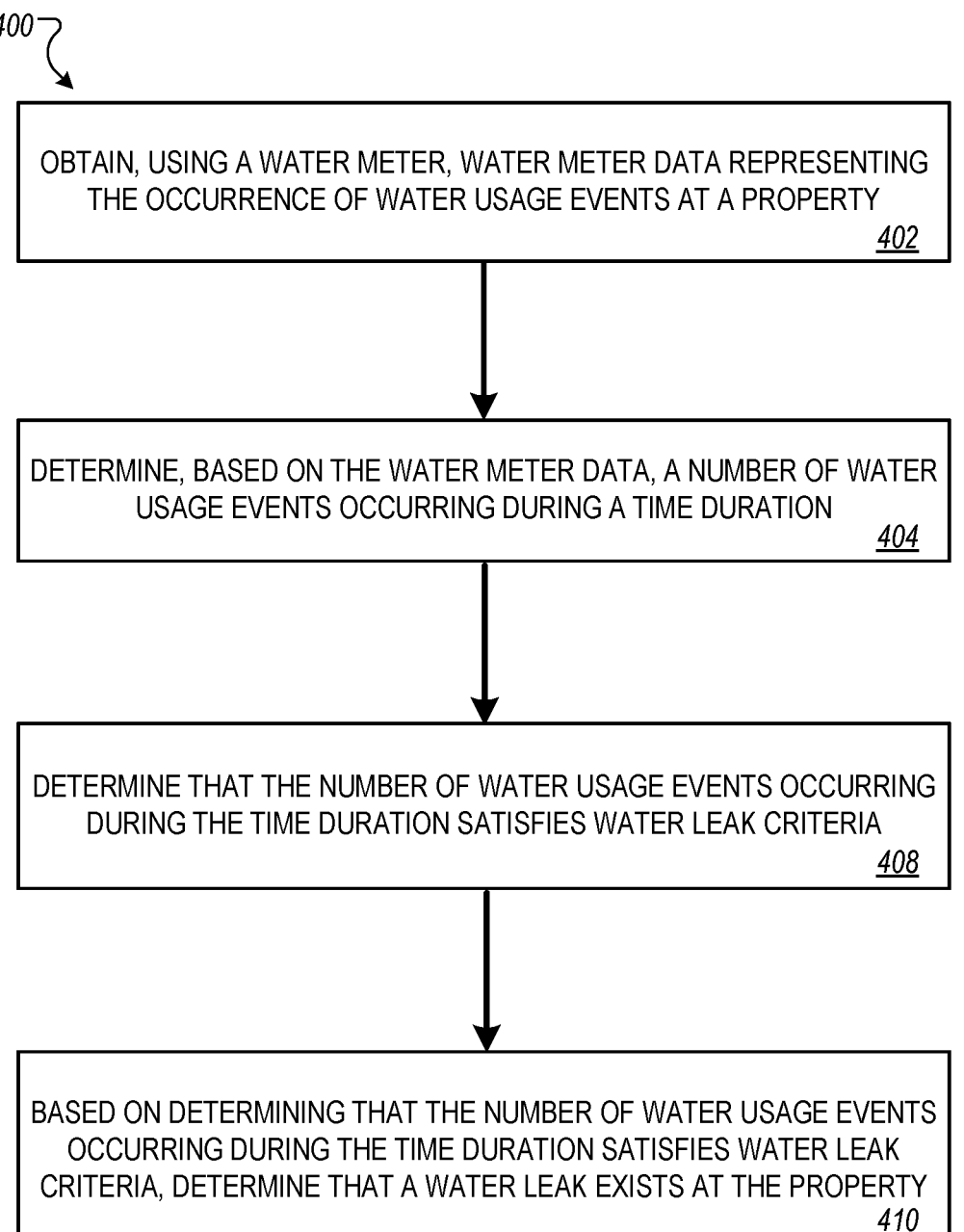

*400*

OBTAIN, USING A WATER METER, WATER METER DATA REPRESENTING THE OCCURRENCE OF WATER USAGE EVENTS AT A PROPERTY
*402*

DETERMINE, BASED ON THE WATER METER DATA, A NUMBER OF WATER USAGE EVENTS OCCURRING DURING A TIME DURATION
*404*

DETERMINE THAT THE NUMBER OF WATER USAGE EVENTS OCCURRING DURING THE TIME DURATION SATISFIES WATER LEAK CRITERIA
*408*

BASED ON DETERMINING THAT THE NUMBER OF WATER USAGE EVENTS OCCURRING DURING THE TIME DURATION SATISFIES WATER LEAK CRITERIA, DETERMINE THAT A WATER LEAK EXISTS AT THE PROPERTY
*410*

FIG. 4

PERIODIC WATER LEAK DETECTION

CROSS-REFERENCE TO RELATED APPLICATION

This application is a continuation of U.S. application Ser. No. 17/398,214, filed Aug. 10, 2021, which claims the benefit of U.S. Provisional Application No. 63/065,025, filed Aug. 13, 2020, and titled "Water Leak Detection." The disclosure of each of the foregoing applications is incorporated herein by reference.

TECHNICAL FIELD

This specification relates generally to water monitoring technology.

BACKGROUND

Water can be consumed at a property through plumbing fixtures such as sinks, toilets, and showers. The amount of water consumption at the property can be monitored using a water meter. The water meter can measure the rate of water flowing through a pipe to the property.

SUMMARY

The subject matter of the present disclosure is related to technique for detecting water leaks at a property, controlling the flow of water into the monitored property, and performing other functions. A water meter can monitor water consumption rates of the property over time. By monitoring patterns of water consumption, the water meter can detect water leaks at the property.

Water leaks may occur in plumbing systems of a property. Some water leaks may be small, and might not be steady or constant. For example, a small water leak from a self-filling tank, e.g., a toilet tank, might cause the tank to refill periodically. Leaks that are periodic or inconsistent can be difficult to detect.

An example process for detecting periodic leaks includes counting, using a meter, the number of water flow events, or water usage events, within a specified time period. Normal water usage often includes a high number of water usage events over a short period of time, e.g., when occupants wash dishes or take showers, with long periods of little to no flow events, e.g., when the property is unoccupied, or occupants are sleeping. The number of water usage events per unit time over an extended period is therefore often small in a normal water usage scenario.

When there is a periodic water leak at the property, there will likely be a higher number of water usage events during the times where little to no water usage is expected, thus increasing the number of water usage events per unit time. The meter can thus detect abnormal water usage based on the number of usage events that occur at the property during a time duration. If the number of water usage events meets criteria for a water leak, the water meter can perform a system action such as transmitting a notification of the water leak to a user, shutting off water flow to the house, sounding an audible alarm, or a number of other actions.

Some processes for detecting periodic leaks rely on detecting water usage periodicity. These processes can allow the meter to detect the periodic leak more quickly than detection methods that are based on counting the number of water usage events. In some examples, Fast Fourier Transform (FFT) or autocorrelation can be used to extract the periodicity of water usage events and trigger an alert if the periodicity meets criteria for a water leak, e.g., by rising above a threshold periodicity. The FFT and autocorrelation processes can extract periodicity from a noisy signal, where noise can be defined as flow events that are non-periodic or random in nature.

In some examples, periodic leaks can be detected by measuring the time between flow events and performing statistical analysis to determine the periodicity of the flow events. If the periodicity of the flow events meets criteria for a water leak, the water meter can perform a system action.

In general, one innovative aspect of the subject matter described in this specification can be embodied in a method including obtaining, using a water meter, water meter data representing the occurrence of water usage events at a property; determining, based on the water meter data, a periodicity of water usage events; determining that the periodicity of water usage events satisfies water leak criteria; and based on determining that the periodicity of water usage events satisfies water leak criteria, determining that a water leak exists at the property.

The foregoing and other embodiments can each optionally include one or more of the following features, alone or in combination. In some implementations, determining the periodicity of water usage events includes determining an average time between a start of sequential water usage events; and determining that the periodicity of water usage events satisfies water leak criteria includes determining that the average time between the start of sequential water usage events is less than a threshold time between the start of sequential water usage events.

In some implementations, the water meter data includes a waveform of water usage in the time domain.

In some implementations, the waveform of water usage in the time domain includes a waveform of water flow rate varying over time.

In some implementations, determining the periodicity of water usage events includes: transforming the water meter data from the time domain to the frequency domain; and determining a magnitude of a frequency signal of the water meter data in the frequency domain; and determining that the periodicity of water usage events satisfies water leak criteria includes determining that the magnitude of the frequency signal satisfies water leak criteria.

In some implementations, determining that the periodicity of water usage events satisfies water leak criteria includes: determining that an average time duration between the start of sequential water usage events is less than a threshold time duration; and determining that a magnitude of a frequency signal of water meter data in the frequency domain exceeds a threshold magnitude.

In some implementations, the method includes determining a likelihood that a water leak exists at the property based on determining that a magnitude of the frequency signal exceeds a threshold magnitude.

In some implementations, determining that a water leak exists at the property includes determining that a likelihood that the water leak exists at the property exceeds a threshold likelihood.

In some implementations, determining the periodicity of water usage events includes extracting a periodicity of water usage events from the water meter data using waveform analysis.

In some implementations, the waveform analysis includes fast-Fourier transform analysis.

In some implementations, a water usage event includes an event in which water flow rate exceeds a threshold water usage.

In some implementations, a water usage event includes an event in which a water flow rate exceeds the threshold water flow rate for a time duration that exceeds a threshold time duration.

In some implementations, a water usage event includes an event in which a water flow rate exceeds the threshold water flow rate for a time duration that exceeds a minimum threshold time duration and is less than a maximum threshold time duration.

In some implementations, a start of a water usage event includes a time when water usage measured by the water meter rises above zero gallons per minute.

In some implementations, the method includes: in response to determining that a water leak exists at the property, transmitting, to a computing device, a notification that the water leak exists at the property.

In some implementations, the method includes: in response to determining that a water leak exists at the property, transmitting, to a water valve at the property, an instruction that causes the water valve to adjust position.

In some implementations, determining that a water leak exists at the property includes determining that a leak exists from an automatic filling tank at the property.

Implementations of the described techniques may include hardware, a method or process implemented at least partially in hardware, or a computer-readable storage medium encoded with executable instructions that, when executed by a processor, perform the operations The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for monitoring water systems in a monitored property based on periodicity of water usage events.

FIG. 4 is a flow diagram of an example process for monitoring water systems in a monitored property based on numbers of water usage events.

Like reference numbers and designations in the various drawings indicate like elements.

DETAILED DESCRIPTION

Figure 1:
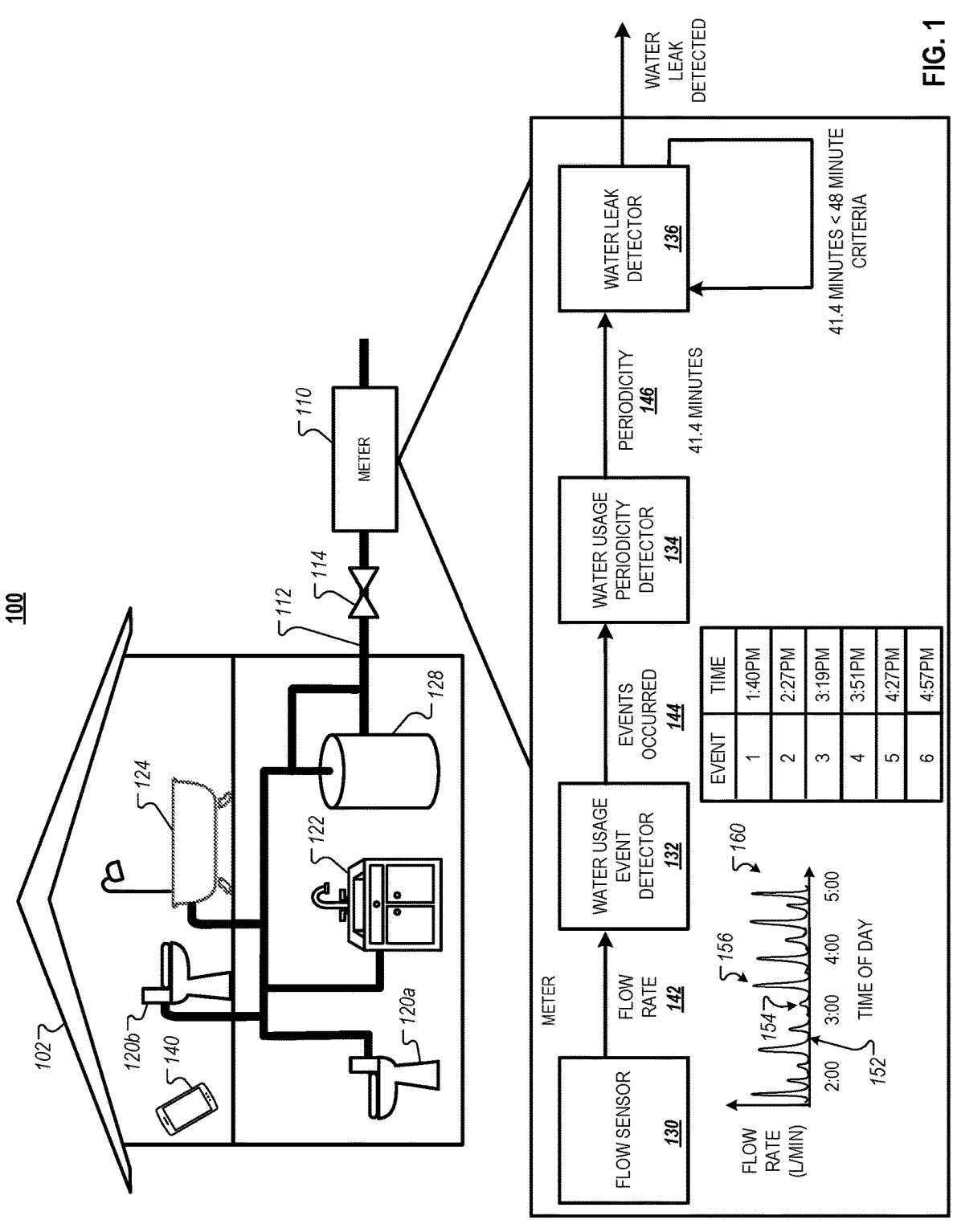
FIG. 1 is a contextual diagram of an example system for monitoring water systems at a property based on periodicity of water usage events.

FIG. 1 is a contextual diagram of an example system 100 for monitoring water systems in a monitored property 102. The system includes a smart meter 110, inlet pipe 112, water heater 128, downstairs toilet 120a, upstairs toilet 120b, sink 122, and bathtub 124. In some implementations, the meter 110 can be compatible with any hot water or cold water input and can be placed with a centralized or decentralized water source. In one example, the meter 110 can be placed after the water heater 128, e.g., between the water heater 128 and other water consuming devices and fixtures at the property 102. In some implementations, the meter 110 can exist within or be integrated with the water heater 128, rather than being an independent component as shown in the system 100.

As illustrated in system 100, the property 102 obtains water through an inlet pipe 112 from an external water supplier. For example, a municipal water supply can supply water using a pump, centrifuge, or other means to provide water at a predefined pressure to the monitored property 102. The water heater 128 can hold a reservoir of a predetermined amount of water. For example, the reservoir can range in size from 30 to 80 gallons. The water heater 128 can vary the amount of water found in the reservoir based on residents using various fixtures in the property 102 that require water. For example, the bathtub 124 can draw five gallons per minute during a five minute period. In response, the reservoir of the water heater 128 may deplete. The water heater 128 thus draws more water from the inlet pipe 112 and heats up the newly acquired water in its reservoir to service other devices that require hot water. As the water flows through the inlet pipe 112, the meter 110 uses a flow sensor 130 to measure water flow through the inlet pipe 112. A valve 114 can be operable to adjust and control water flow through the inlet pipe 312.

The meter includes firmware and/or software that facilitate reading data from sensors within its housing unit, making decisions based on data provided by the sensors, and reporting information to external components and recipients. The meter can deliver data representing the sensors' readings to a computer system such as a control unit server within the monitored property or to a security system external to the monitored property. Based on the readings from the sensors, the meter can additionally perform other functions. For example, based on threshold values of flow rates, water consumption, and/or water temperature, the meter can execute rules corresponding to user-desired criteria at the monitored property. These rules can include transmitting notifications regarding water characteristics to various client devices of the property owner, shutting off water flow to the property or sounding an audible alarm.

The meter 110 includes the flow sensor 130, a water usage event detector 132, a water usage periodicity detector 134, and a water leak detector 136. The flow sensor 130 of the meter 110 measures a flow rate of the water flowing through the inlet pipe 112 in order to monitor water usage at the monitored property 102. The flow sensor 130 can be any type of flow sensor, e.g., turbine, venturi, vortex, ultrasonic, electromagnetic, etc. The flow sensor 130 can output flow data, e.g., as measured in units of gallons per minute, gallons per hour, liters per minute, liters per hour or any other unit measured as unit of volume per time period. The flow sensor 130 may be capable of measuring a wide range of flow rates, such as high flow rates (3600 liters per hour or 60 liters per minute, for example), to ultra-low flow rates (zero to six liters per hour) in plumbing systems.

The water usage event detector 132, the water usage periodicity detector 134, and the water leak detector 136 can each be provided as one or more computer executable software modules or hardware modules. That is, some or all of the functions of water usage event detector 132, the water usage periodicity detector 134, and the water leak detector 136 can be provided as a block of computer code, which upon execution by a processor, causes the processor to perform functions described below. Some or all of the functions of water usage event detector 132, the water usage periodicity detector 134, and the water leak detector 136 can be implemented in electronic circuitry, e.g., by individual computer systems (e.g., servers), processors, microcontrollers, a field programmable gate array (FPGA), or an application specific integrated circuit (ASIC).

In some cases, the meter 110 performs all of the operations of the processes described with reference to FIG. 1. In some examples, the meter 110 performs some of the operations, and another computer system performs other of the operations. For example, in some cases the meter 110 can obtain water meter data, e.g., data representing a flow rate through the inlet pipe 112, using the flow sensor 130. The meter 110 can then transmit the water meter data to another computer system, e.g., a control unit of a monitoring system at the property, or a remote monitoring server. The other computer system can perform the operations of the water usage event detector 132, water usage periodicity detector 134, and water leak detector 136.

In another example, the meter 110 can include the flow sensor 130 and the water usage event detector 132. The meter 110 can obtain water meter data and detect water usage events at the property 102. The meter 110 can then transmit water usage event data to another computer system. The other computer system can perform the operations of the water leakage event periodicity detector and the water leak detector.

In some implementations, the meter 110 can include or can communicate with a smart valve 114 that can control flow of water to the monitored property 102. For example, the meter 110 can transmit a command to a smart valve 114 installed on the inlet pipe 112. The meter 110 can command the smart valve 114 to shut, ceasing or slowing water flow to the property 102, or to open, allowing water to flow to the property 102.

The meter 110 can detect changes in flow rate through the inlet pipe 112. Changes in flow rate can indicate water consumption devices in the monitored property 102 are consuming water. For example, an increase in water flow rate may indicate water flowing from bathtub 124, water flowing from the sink 122, water flowing to the downstairs toilet 120a, water flowing to the upstairs toilet 120b, or any combination of these.

In some cases, changes in water flow rates can indicate leakages. A leak can include a burst pipe, a pinhole leak in a pipe, a faucet running water for an extended period of time, or a device leaking water. For example, a toilet may leak water through a flapper. When a toilet has a worn out flapper, or a flapper that does not seal property, water can leak from the toilet tank to the toilet bowl and ultimately into the wastewater system. Once the water level in the tank drops below a certain level, the toilet's fill valve opens, allowing the tank to refill at a rate similar to a normal toilet flush. Water enters the property through the inlet pipe 112. The meter 110 detects the increase in water flow.

Although shown in FIG. 1 as including a single meter 110, in some examples, the system 100 can include more than one meter. For example, the property can include a meter for a cold water pipe and a meter for a hot water pipe. In some examples, the system 100 can include a meter for one floor of the property and another meter for another floor of the property. In some examples, the property may include multiple units, and can include a meter for each unit.

An example process 200 for detecting a water leak is illustrated in FIG. 2. The process 200 includes obtaining, using a water meter, water meter data representing the occurrence of water usage events at a property (202), determining, based on the water meter data, a periodicity of water usage events (204), determining that the periodicity of water usage events satisfies water leak criteria (208), and based on determining that the periodicity of water usage events satisfies water leak criteria, determining that a water leak exists at the property (210).

The process 200 includes obtaining, using a water meter, water meter data representing the occurrence of water usage events at a property (202). For example, the water flow sensor 130 of the water meter 110 detects water flow through the inlet pipe 112 over time. The flow sensor 130 outputs flow sensor data, e.g., data representing a measured flow rate 142 over time.

In some implementations, the water meter data includes a waveform of water usage in the time domain. For example, the water meter data can include data representing a waveform of flow rate vs. time. The flow rate can be represented in units of, e.g., liters per minute, gallons per minute, liters per second, milliliters per second, cubic meters per second, etc. Time can represented in units of, e.g., seconds, minutes, or hours.

The waveform of water usage in the time domain can include a waveform of water flow rate varying over time. For example, in FIG. 1, the flow rate 142 is illustrated as a graph 160 of flow rate vs. time of day. The flow rate 142 fluctuates over a time period of approximately four hours. During the time period, the flow sensor data indicates variations of flow rates, including times of no-flow, e.g., at point 152, times of low-flow, e.g., at point 154, and times of high-flow, e.g., at point 156.

During no-flow times, water is not being consumed at the property 102. For example, during no-flow times, all water fixture valves and faucets are likely in the off position, and no water appliances are operating. During low-flow times, water may be used by a low-flow water fixture such as the sink 122. A low-flow water fixture may draw, for example, between zero and one gallon per minute. During high-flow times, water may be used by a high-flow water fixture such as the downstairs toilet 120a, the upstairs toilet 120b, or the bathtub 124. A high-flow water fixture may draw, for example, between one and ten gallons per minute.

The water usage event detector 132 receives data representing the measured flow rate 142 from the flow sensor 130. The water usage event detector 132 detects water usage events based on the flow rate data. In some examples, a water usage event can be defined as an event in which the water flow rate exceeds a threshold water usage. For example, a water usage event can be defined as an event in which the water flow rate exceeds one gallon per minute. In the example of FIG. 1, point 156, with a high flow rate, may meet criteria for a water usage event. In contrast, point 154, with a lower flow rate, might not meet criteria for a water usage event.

The meter can be programmed to detect leaks related to automatic filling tanks at the property 102, e.g., the tanks of toilets 120a and 120b. In addition to toilet tanks, other automatic filling tanks and appliances can include, for example, water heaters, boilers, fountains, ponds, pools, aquariums, fire suppression system tanks, etc.

A typical toilet may consume approximately 1.5 gallons per flush. The tank may take approximately forty-five seconds to refill. Thus, a toilet flush, e.g., of the toilet 120a may result in water flowing to the property 102 at a rate of two gallons per minute for a duration of forty-five seconds. In contrast, a typical bath may consume approximately five gallons per minute for a duration of approximately six minutes, and a typical shower may consume approximately two gallons per minute for a duration of approximately ten minutes. Washing one's hands in a sink may consume less than one gallon per minute for a duration of twenty seconds.

To detect leaks related to automatic filling tanks at the property 102, a water usage event can be defined by a threshold water flow rate, a period of time during which the water flow rate exceeds the threshold water flow rate, or a combination of both. In some implementations, a water usage event includes an event in which a water flow rate exceeds a threshold water usage. For example, a threshold water usage can be 0.8 gallons per minute, and a water usage event can include an event in which a water flow rate measured by the meter 110 exceeds 0.8 gallons per minute.

In some implementations, a water usage event includes an event in which a water flow rate exceeds the threshold water flow rate for a time duration that exceeds a threshold time duration. For example, the threshold time duration can be ten seconds. In a more specific example, the water usage event can be defined as an event in which the water flow rate exceeds a threshold of 1.5 gallons per minute for a time duration greater than ten seconds.

In some implementations, a water usage event includes an event in which a water flow rate exceeds a threshold water flow rate for a time duration that exceeds a minimum threshold time duration and is less than a maximum threshold time duration. For example, the threshold water flow rate can be 1.0 gallons per minute, the minimum threshold time duration can be twenty seconds and the maximum threshold time duration can be two minutes. In a more specific example, the water usage event can be defined as an event in which the water flow rate exceeds a threshold of 1.0 gallons per minute for a time duration greater than twenty seconds and less than two minutes.

By defining a water usage event based on the period of time during which the water flow rate exceeds the threshold water usage, the system 100 can detect leaks from toilets 120*a*, 120*b*, while reducing noise that may be caused by non-periodic water usage, e.g., use of the bathtub 124 or the sink 122. For example, use of the bathtub 124 likely causes the water flow rate to exceed the threshold water flow rate for an amount of time greater than the maximum time duration, while use of the sink 122 likely causes the water flow rate to exceed the threshold water flow rate for an amount of time less than the minimum time duration.

In some examples, a start time of a water usage event can be defined based on a time that water usage exceeds zero gallons per minute. For example, a start of a water usage event can be a time when water usage measured by the water meter 110 rises above zero gallons per minute, e.g., to 0.1 gallons per minute. In some examples, a start time of the water usage event can be defined based on a time that water usage exceeded a threshold flow rate. Similarly, an end time of a water usage event can be defined based on a time that the water usage returns to zero gallons per minute, or based on a time that the water usage drops below the threshold water usage.

In some implementations, the flow sensor 130 can be a voltage-based low flow sensor. To determine a water usage event, the water usage event detector 132 can evaluate multiple characteristics of the flow rate data 142 output by the flow sensor 130. As a first characteristic, a negative voltage slope signifies the start of water flow. The time that the voltage slope becomes negative is labeled as a start time of water flow. As a second characteristic, a positive voltage slope following a negative voltage slope signifies the end of water flow. The time that the voltage slope becomes positive is labeled as an end time of water flow. If the time between the start and end of the event is less than a minimum time, e.g., five seconds or ten seconds, the data is not categorized as representing a water usage event. If the time between the start and end of the event is greater than the minimum time, the data is categorized as representing a water usage event.

The water usage event detector 132 outputs data indicating the occurrence of events, each event being labeled with an associated time of event. In some examples, the water usage event can be labeled with a time of event that corresponds with the start of the water usage event, e.g., the time that the water usage exceeded zero gallons per minute. In some examples, the water usage event can be labeled with a time of event that corresponds with the end of the water usage event or with a midpoint of the water usage event.

In the example of FIG. 1, the water usage event detector 132 outputs event data 144. The event data 144 includes data indicating a start time of each water event. The event data 144 indicates events at 1:40 μm, 2:27 pm, 3:19 pm, 3:51 pm, 4:27 pm, and 4:57 pm.

The process 200 includes determining, based on the water meter data, a periodicity of water usage events (204). For example, the water usage periodicity detector 134 receives the water meter data indicating the occurrence of the events at 1:40 μm, 2:27 pm, 3:19 pm, 3:51 pm, 4:27 pm, and 4:57 pm. The water usage periodicity detector 134 determines the periodicity of the water usage events. In some examples, the periodicity of water usage events can be determined based on statistical analysis of the time of the events.

In some implementations, determining the periodicity of water usage events includes determining an average time between a start of sequential water usage events. For example, the water usage periodicity detector 134 can determine the periodicity of water usage events based on an average time between the start of sequential events. For example, in the example of FIG. 1, a first event, Event 1, started at 1:40 μm. The time 1:40 pm corresponds to the time that the water usage event began. The duration of the water usage event may have been forty-five seconds, e.g., the time for the tank of the downstairs toilet 120*a* to refill. A second sequential event, Event 2, started at 2:27 pm and the duration of the second event may have been one minute, e.g., the time for the upstairs toilet 120*b* to refill. Thus, the time between the first event and the second event, based on the starting time of each event, is forty-seven minutes.

The water usage periodicity detector 134 can determine an average time between the start of sequential water usage events over a time duration such as a duration between 1:30 pm and 5:00 pm. For example, the water usage periodicity detector 134 can determine a time between Event 1 and Event 2 of forty-seven minutes, a time between Event 2 and Event 3 of fifty-two minutes, etc. Thus, the water usage periodicity detector 134 can determine time between each sequential event of the event data 144. Based on the event data 144, the water usage periodicity detector 134 can determine the periodicity of water usage events based on the average time between the start of sequential water usage events. The water usage periodicity detector 134 outputs periodicity data 146 indicating a periodicity of water events. In the example of FIG. 1, the water usage periodicity detector 134 outputs a periodicity of 41.4 minutes.

Determining periodicity based on the start times of sequential events can be more accurate than determining periodicity based on end times of sequential events, since durations of the events can be variable. For example, the upstairs toilet 120*b* may require more time for the tank to fill than the downstairs toilet 120*a* due to differences in water pressure.

In other examples, periodic leaks can be detected by measuring the time between flow events and performing statistical analysis to determine the periodicity of the flow events. For example, the water usage periodicity detector 134 can determine time between the start of subsequent water usage events of a dataset to determine the periodicity. The water usage periodicity detector 134 can then calculate a root-mean-squared error of the dataset. The water usage periodicity detector 134 can then threshold and filter the dataset to reduce noise and error. For example, the water usage periodicity detector 134 can filter out data with a root-mean-squared error greater than a threshold, e.g., of ten seconds.

The water usage periodicity detector 134 can also filter out data with a periodicity less than a minimum periodicity, e.g., of two minutes. Water usage of events having a periodicity less than the minimum periodicity may more likely indicate water consumption by a user, than a leak. For example, water usage events having a periodicity of one minute may represent a user using the toilet 120*a* and then the sink 122. Thus, the water usage periodicity detector 134 can filter out data with short periodicities in order to remove noise from the dataset caused by user consumption.

In some implementations, determining the periodicity of water usage events includes transforming the water meter data from the time domain to the frequency domain and determining a magnitude of a frequency signal of the water meter data in the frequency domain. For example, the water usage event detector can transform the water meter data from the time domain, as shown in graph 160, to the frequency domain. While a time-domain graph, e.g., graph 160, shows how the water usage changes over time, a frequency-domain graph shows how much of the water usage data fails within each given frequency band over a range of frequencies. The water meter data can be converted from the time domain to the frequency domain using mathematical operators such as transforms. An example is a Fourier transform, e.g., a fast Fourier transform (FFT) or a discrete Fourier transform (DFT).

In some implementations, determining the periodicity of water usage events includes extracting a periodicity of water usage events from the water meter data using waveform analysis. Waveform analysis can include FFT analysis, which can be used to identify regular contributions to a fluctuating signal. For example, when the water meter data is transformed to the frequency domain, the periodicity of regular water usage events can be determined from peaks in the frequency domain graph. In an example, a toilet tank may have a leak that causes the toilet tank to refill every thirty minutes, e.g., twice per hour. The frequency domain graph of water usage will likely therefore show a peak at a frequency corresponding to once per half-hour. The water usage periodicity detector 134 can perform waveform analysis to identify the peak or peaks in the frequency domain graph that correspond to periodic water usage event. In this way, FFT waveform analysis can be used to extract the periodicity of water usage events from flow rate data.

In some examples, in addition to or instead of FFT analysis, the water usage periodicity detector 134 can use autocorrelation analysis to identify periodicity of water leaks. Autocorrelation is a mathematical tool for finding repeating patterns, such as the presence of a periodic signal obscured by noise. Autocorrelation can be used to identify regular or periodic water usage events, such as those corresponding to a leak from a refilling tank.

The process 200 includes determining that the periodicity of water usage events satisfies water leak criteria (208). For example, the water leak detector 136 receives the periodicity data 146 and determines, based on the periodicity data, whether the periodicity of water usage events satisfies water leak criteria.

In some implementations, determining that the periodicity of water usage events satisfies water leak criteria includes determining that the average time between the start of sequential water usage events is less than a threshold time between the start of sequential water usage events. For example, a threshold time between the start of sequential water usage events can be 48.0 minutes. The water leak detector 136 can determine that the periodicity of water usage events of 41.4 minutes is less than the threshold time of 48.0 minutes, and therefore that the periodicity of water usage events satisfies water leak criteria.

In some implementations, determining that the periodicity of water usage events satisfies water leak criteria includes determining that the magnitude of the frequency signal satisfies water leak criteria. For example, the water leak criteria can include a minimum threshold magnitude of the water usage data in the frequency domain. The water leak detector 136 can determine that the normalized magnitude of the frequency signal in a particular frequency range exceeds a configurable threshold. The particular frequency range can be, e.g., a frequency range that includes frequencies of 1.0 Hz or less. In some examples, the configurable threshold can be implemented as a user-configurable sensitivity setting. Based on the normalized magnitude of the frequency signal exceeding the threshold, the water leak detector 136 can determine that the water usage data satisfies water leak criteria. In some examples, the threshold magnitude can include a magnitude relative to other peaks. For example, a threshold magnitude may be a magnitude of a largest peak that is at least fifty percent greater than a magnitude of a next largest peak in the frequency domain.

In some implementations, determining that the periodicity of water usage events satisfies water leak criteria includes determining that an average time duration between the start of sequential water usage events is less than a threshold time duration and determining that a magnitude of a frequency signal of water meter data in the frequency domain exceeds a threshold magnitude. For example, the water leak detector 136 can determine that an average time duration between the start of sequential water usage events is thirty minutes and is less than a threshold time duration of forty minutes. The water leak detector 136 can also determine that the magnitude of the frequency signal of water meter data exceeds a threshold magnitude. Based on the average time duration being less than the threshold time duration, and on the magnitude exceeding the threshold magnitude, the water leak detector 136 can determine that the periodicity of water usage events satisfies water leak criteria.

In some implementations, the process 200 includes determining a likelihood that a water leak exists at the property based on determining that a magnitude of the flow rate at a particular frequency exceeds a threshold magnitude. For example, the water leak detector 136 can determine a higher likelihood, e.g., of ninety percent, that the water leak exists based on a higher magnitude of a peak in the frequency domain, and a lower likelihood, e.g., of fifty percent, that the water leak exists based on a lower magnitude of a peak in the frequency domain.

Water leak criteria can vary based on a number of factors. In some examples, the water leak criteria can be calibrated for the property 102. A property with many occupants will likely consume more water, and have more frequent water usage events, than a property with fewer occupants, and the water leak criteria can be adjusted based on the greater water consumption. For example, a meter at a property with five occupants can have a water leak criteria including a water usage event periodicity of less than or equal to twenty minutes. In contrast, a meter at a property with one occupant can have water leak criteria including a water usage event periodicity of less than or equal to two hours.

To generate calibrated water leak criteria, the meter 110 can measure water usage at the property 102 over a period of time. For example, upon installation of the meter 110, the meter 110 can undergo a calibration period, e.g. of a week, several weeks, or a month. During the calibration, the meter 110 can determine typical water consumption at the property. For example, the meter 110 may determine an average water consumption in gallons consumed per day or per week. In another example, the meter 110 may determine an expected number of water usage events per hour, per day, or per week. In another example, the meter 110 may determine an expected periodicity of water usage events.

The water leak criteria can vary based on factors such as a time of day, a day of week, a season of the year, etc. For example, the property 102 may typically have more water usage events in the morning and evening, and may have fewer water usage events in mid-day. Similarly, the property 102 may typically have more water usage events in summertime than in wintertime.

In some examples, the meter 110 can generate calibrated water leak criteria based on data from multiple properties. For example, the meter 110 can receive, e.g., from a remote server and over a long-range data link, data indicating typical water usage at multiple properties. The meter 110 can receive the data indicating typical water usage for properties that are similar to the property 102. For example, the meter 110 can receive data indicating typical water usage at properties that are located near the property 102, properties that have the same number of occupants as the property 102, properties that have the same number of water fixtures as the property 102, or any combination of these. The meter 110 can generate and update the water leak criteria based on the data from the multiple properties.

In some examples, a remote server can receive data indicating typical water usage at multiple properties. The remote server can generate water leak criteria based on the data from the multiple properties. The remote server can transmit, to the meter 110, water leak criteria based on the data from the multiple properties.

In some examples, the meter 110 can continue to generate and update water leak criteria when the meter 110 is in operation. For example, instead of or in addition to a calibration period, the meter 110 can continue to monitor water usage at the property 102 over time while the meter 110 is in operation. The meter 110 can recalculate and update the water leak criteria based on the monitored water usage at the property 102 over time.

In some examples, the meter 110 can update the water leak criteria periodically or in response to an event. For example, the meter 110 can update the water leak criteria periodically, e.g., once per day, once per week, once per month, etc. In another example, the meter 110 can update the water leak criteria in response to an event, e.g., the meter 110 being installed, reinstalled, or moved. The meter 110 can also update the water leak criteria when the property gains an occupant, loses an occupant, or replaces occupants, e.g., if the property 102 is bought, sold, rented, or vacated. In some cases, the meter 110 can communicate with a user device, e.g., a mobile device 140 operated by an occupant of the property 102. The occupant can provide input to the meter 110 via the mobile device indicating when the occupancy of the property 102 changes. The meter 110 can then calibrate the water leak criteria in response to receiving input indicating the change in occupancy.

In the example of FIG. 1, the water leak criteria includes a periodicity of forty-eight minutes. Water usage events with a periodicity of less than forty-eight minutes meet criteria for a water leak, while water usage events with a periodicity of greater than forty-eight minutes do not meet criteria for a water leak.

The water leak detector 136 determines, based on the periodicity data 146, whether the periodicity of water usage events satisfies the water leak criteria. In the example of FIG. 1, the water leak detector compares the periodicity of 41.4 minutes to criteria of a periodicity of forty-eight minutes. The water leak detector 136 determines that the periodicity of 41.4 minutes meets criteria of being forty-eight minutes or less, and therefore satisfies the water leak criteria.

The process 200 includes, based on determining that the periodicity of water usage events satisfies water leak criteria, determining that a water leak exists at the property (210). For example, based on determining that the periodicity of 41.4 minutes meets the criteria for a water leak of being less than forty-eight minutes, the water leak detector 136 determines that a water leak exists at the property 102.

In some implementations, determining that a water leak exists at the property includes determining that a likelihood that the water leak exists at the property exceeds a threshold likelihood. For example, the threshold likelihood may be seventy percent. The water leak detector 136 can determine that a likelihood that the water leak exists at the property 102 is eighty percent and therefore exceeds the threshold likelihood. Thus, the water leak detector 136 can determine that the water leak exists at the property 102.

In some implementations, determining that a water leak exists at the property includes determining that a leak exists from an automatic filling tank at the property. For example, the water leak detector 136 may determine that a periodic water usage event is occurring approximately every forty-two minutes at the property 102. Based on detecting the periodic water usage event, the water leak detector 136 can determine that a water leak exists from an automatic filling tank at the property 102, e.g., a toilet tank.

In some implementations, the meter 110 can determine a likelihood that a water fixture within the property 102 is leaking. The likelihood can be a statistical likelihood, such as a percentage that indicates how likely it is that a water leak exists. The likelihood that a water leak exists can be based, for example, on a strength or magnitude of a frequency signal, e.g., as evaluated using FFT analysis. A stronger frequency signal may indicate a regular periodicity of water usage events. Based on detecting a strong frequency signal, the meter 110 can determine a high likelihood that a water leak exists. In contrast, a weak or low magnitude frequency signal may indicate irregular periodicity of water usage events. Based on detecting a weak frequency signal, the meter 110 can determine a lower likelihood that a water leak exists. In some examples, the water leak criteria can include a frequency signal magnitude above a threshold magnitude. In some examples, the water leak criteria can include both a periodicity being less than the threshold periodicity, and the frequency signal being greater than a threshold magnitude.

In response to determining that a water leak exists, or likely exists, at the property 102, the meter 110 can perform one or more actions. In some implementations, users can enable rule-based actions corresponding to the meter 110. Through a user interface on a mobile device or interfacing directly with the meter 110, an occupant or other user can set up rules on the meter 110. Rules can prescribe actions to be taken by the meter 110 in response to detecting a water leak at the property.

In some implementations, the process 200 includes, in response to determining that a water leak exists at the property, transmitting, to a computing device, a notification that the water leak exists at the property. For example, the water leak detector 136 of the meter 110 can transmit a notification, e.g., to a mobile device 140 of an occupant or other user associated with the property 102. The notification can indicate the likely presence of a water leak. For example, in response to identifying that a water leak likely exists based on high periodicity of water usage events, the meter 110 can transmit a notification to the mobile device 140 of the property owner or to a control panel located at the property 102. The notification can indicate to the property owner that a water leak likely exists at the property 102. For example, the notification can recite "Possible Water Leak Detected Due to High Frequency of Water Usage." The property owner can respond to the notification, indicating that a technician should be dispatched or that no water leak exists, for example. In some examples, in response to detecting a water leak at the property, the meter 110 can activate an audible alarm at the property 102 in order to alert occupants of the property 102 of the water leak.

In some implementations, the process 200 includes, in response to determining that a water leak exists at the property, transmitting, to a water valve at the property, an instruction that causes the water valve to adjust position. For example, the meter 110 can send a command to shut a valve 114 at the property 102 when the meter 110 detects a water leak at the property 102. For example, the meter 110 can send a command to shut a valve 114 on the inlet pipe 112, causing water to stop flowing to the property 102.

In an example scenario, the downstairs toilet 120a has a worn-out flapper, or the flapper did not seal properly on the last usage. Water is slowly leaking from the tank to the bowl, causing the toilet to consume approximately one gallon every twelve minutes. The downstairs toilet 120a is not frequently used and in an area of the property 102 that does not receive regular traffic. Thus, the leak might normally go unnoticed for a long time, e.g., several weeks or months. The meter 110 detects a water usage event periodicity of approximately twelve minutes over the course of two hours. The meter 110 transmits a notification to the mobile device 140 of an owner of the property 102, alerting the owner to the likely water leak. As shown in this example scenario, water leak detection based on periodicity of water usage events can detect water leaks quickly, e.g., within an hour or several hours.

Figure 3:
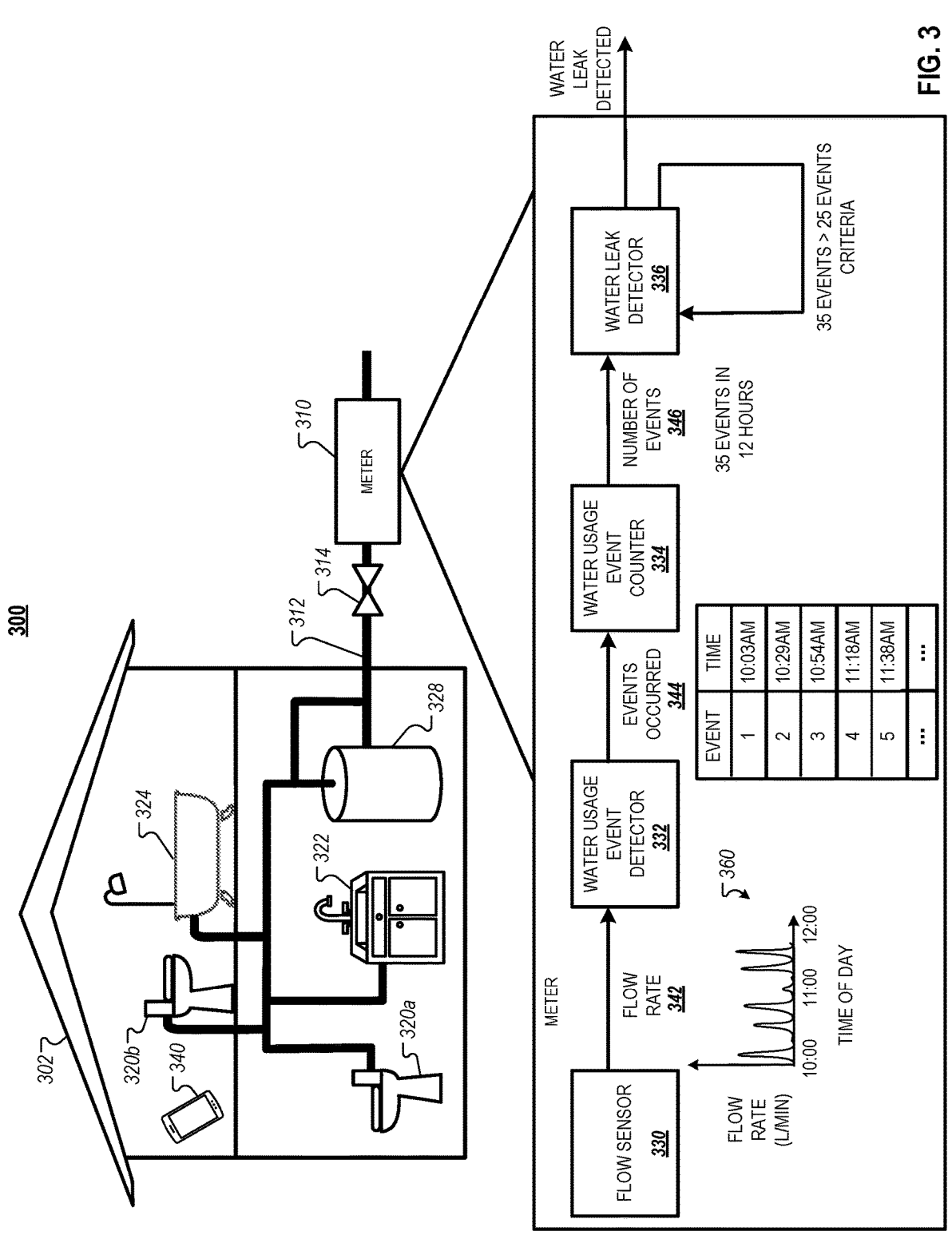
FIG. 3 is a contextual diagram of an example system for monitoring water systems in a monitored property based on numbers of water usage events.

FIG. 3 is another contextual block diagram of an example system including a meter 310 for monitoring water systems in a monitored property 302. The example system shown in FIG. 3 is similar to the system shown in FIG. 1. In particular, the example system 300 of FIG. 3 includes a smart meter 310, inlet pipe 312, water heater 328, downstairs toilet 320a, upstairs toilet 320b, sink 322, and bathtub 324. The property 302 obtains water through an inlet pipe 312 from an external water supplier. As the water flows through the inlet pipe 312, the meter 310 uses a flow sensor 330 to measure water flow through the inlet pipe 312. A valve 314 can be operable to adjust and control water flow through the inlet pipe 312.

The meter 310 includes the flow sensor 330, a water usage event detector 332, a water usage event counter 334, and a water leak detector 336. The flow sensor 330 of the meter 310 measures a flow rate of the water flowing through the inlet pipe 312 in order to monitor water usage at the monitored property 302.

An example process 400 for detecting a water leak is illustrated in FIG. 4. The process includes obtaining, using a water meter, water meter data representing the occurrence of water usage events at a property (402), determining, based on the water meter data, a number of water usage events occurring during a time duration (404), determining that the number of water usage events occurring during the time duration satisfies water leak criteria (408), and based on determining that the number of water usage events occurring during the time duration satisfies water leak criteria, determining that a water leak exists at the property (410).

The process 400 includes obtaining, using a water meter, water meter data representing the occurrence of water usage events at a property (402). For example, the water flow sensor 330 of the water meter 310 detects water flow through the inlet pipe 312 over time. The flow sensor 330 outputs flow sensor data, e.g., data representing a measured flow rate 342 over time. In the example of FIG. 3, the flow rate 342 is illustrated as a graph 360 over time. The flow rate 342 fluctuates over a time duration of twelve hours. In FIG. 3, for clarity, only about two hours of flow rate data is illustrated as a graph 360 of flow rate vs. time of day.

The water usage event detector 332 receives data representing the measured flow rate 342 from the flow sensor 330. The water usage event detector 332 detects water usage events based on the flow rate data.

The water usage event detector 332 outputs data indicating the occurrence of events, each event being labeled with an associated time of event. In the example of FIG. 3, the water usage event detector 332 outputs event data 344. The event data 344 includes data indicating a start time of each water event. The event data 344 indicates events at 10:03 am, 10:29 am, 10:54 am, 11:18 am, and 11:38 am, etc. The event data 344 includes start times for all water usage events that occurred during the time duration of twelve hours.

The process 400 includes determining, based on the water meter data, a number of water usage events occurring during a time duration (404). For example, the water usage event counter 334 receives the water meter data indicating the occurrence of the events at 10:03 am, 10:29 am, 10:54 am, 11:18 am, 11:38 am, etc., during the time duration of twelve hours. The time duration can be any appropriate time duration, e.g., six hours, twelve hours, twenty hours, twenty-four hours, etc.

In some examples, the water usage event counter 334 can determine the number of events at designated time increments. For example, once per hour, the water usage event counter 334 can determine the number of water usage events that occurred during the most recent time duration of twelve hours. In another example, once per twelve hours, the water usage event counter 334 can determine the number of water usage events that occurred during the most recent time duration of twelve hours. In another example, once per day, the water usage event counter 334 can determine the number of water usage events that occurred during the most recent twenty-four hours.

The water usage event counter 334 determines the number of the water usage events occurring during the time duration. The water usage event counter 334 outputs event number data 346 indicating a number of water usage events that have occurred. In the example of FIG. 3, the water usage event counter 334 outputs a number of events of thirty-five events during a time duration of twelve hours.

The process 400 includes determining that the number of water usage events occurring during the time duration satisfies water leak criteria (408). For example, the water leak detector 336 receives the event number data 346 and determines, based on the event number data 346, whether the number of water usage events occurring during the time duration satisfies water leak criteria.

Water leak criteria can vary based on a number of factors. In some examples, the water leak criteria can be calibrated for the property 302. A property with many occupants will likely consume more water than a property with fewer occupants, and the water leak criteria can be adjusted based on the greater water consumption. For example, a meter at a property with five occupants can have water leak criteria including a number of water usage events of forty water usage events per day. In contrast, a meter at a property with one occupant can have water leak criteria including a number of water usage events of ten water usage events per day.

In the example of FIG. 3, the water leak criteria includes a number of water usage events of twenty-five events in a time duration of twelve hours. A number of water usage events greater than twenty-five events within a time duration of twelve hours meets criteria for a water leak, while a number of water usage events less than twenty-five events within a time duration of twelve hours does not meet criteria for a water leak.

The water leak detector 336 determines, based on the event number data 346, whether the number of water usage events satisfies the water leak criteria. In the example of FIG. 3, the water leak detector 336 compares the number of events of thirty-five events in twelve hours to criteria of twenty-five events in twelve hours. The water leak detector 336 determines that the number of events of thirty-five events is greater than the criteria of twenty-five events, and therefore satisfies the water leak criteria.

The process 400 includes, based on determining that the number of water usage events occurring during the time duration satisfies water leak criteria, determining that a water leak exists at the property (410). For example, based on determining that the number of events of thirty-five events meets the criteria for a water leak of being greater than twenty-five events, the water leak detector 336 determines that a water leak exists at the property 302.

In response to determining that a water leak exists, or likely exists, at the property 302, the meter 310 can perform one or more actions. In some examples, the meter 310 can transmit, e.g., to a mobile device 340 of an occupant or other user associated with the property 302. The notification can indicate the likely presence of a water leak. For example, in response to identifying that a water leak likely exists based on high periodicity of water usage events, the meter 310 can transmit a notification to the mobile device 340 of the property owner or to a control panel located at the property 302. The notification can indicate to the property owner that a water leak likely exists at the property 302. For example, the notification can recite "Possible Water Leak Detected Due to Large Number of Water Usage Events."

In some implementations, the meter 110 can detect water leaks based on a combination of periodicity of water usage events, as illustrated in FIGS. 1 and 2, and a number of water usage events, as illustrated in FIGS. 3 and 4. For example, a meter can include both a water usage periodicity detector 134 and a water usage event counter 334. The meter can then detect water leaks based on water usage event periodicity, number of water usage events, or both.

In an example scenario, a multi-unit rental property houses eight tenants that have varying schedules. Because of the unstructured nature of the tenants' schedules, water usage events occur frequently at all times of day. The flapper on one of the toilets at the property becomes slightly misaligned after flushing, which starts a small periodic leak with a periodicity of approximately fifteen minutes. Because of high water usage at the property, periodic leak detection methods, e.g., as described with reference to FIG. 1, can be unable to detect the leak. The meter has determined, based on tracking water usage at the property over time, an average number of flow events of approximately 150 usage events per day. With the periodic leak, the number of flow events increases to approximately 250 events per day. The meter detects the increase in flow events and sends an alert to the property alerting the property owner of the periodic leak. As shown in this example scenario, water leak detection based on the number of water usage events can detect water leaks even when the periodicity of water usage events is irregular or unpredictable.

Figure 5:
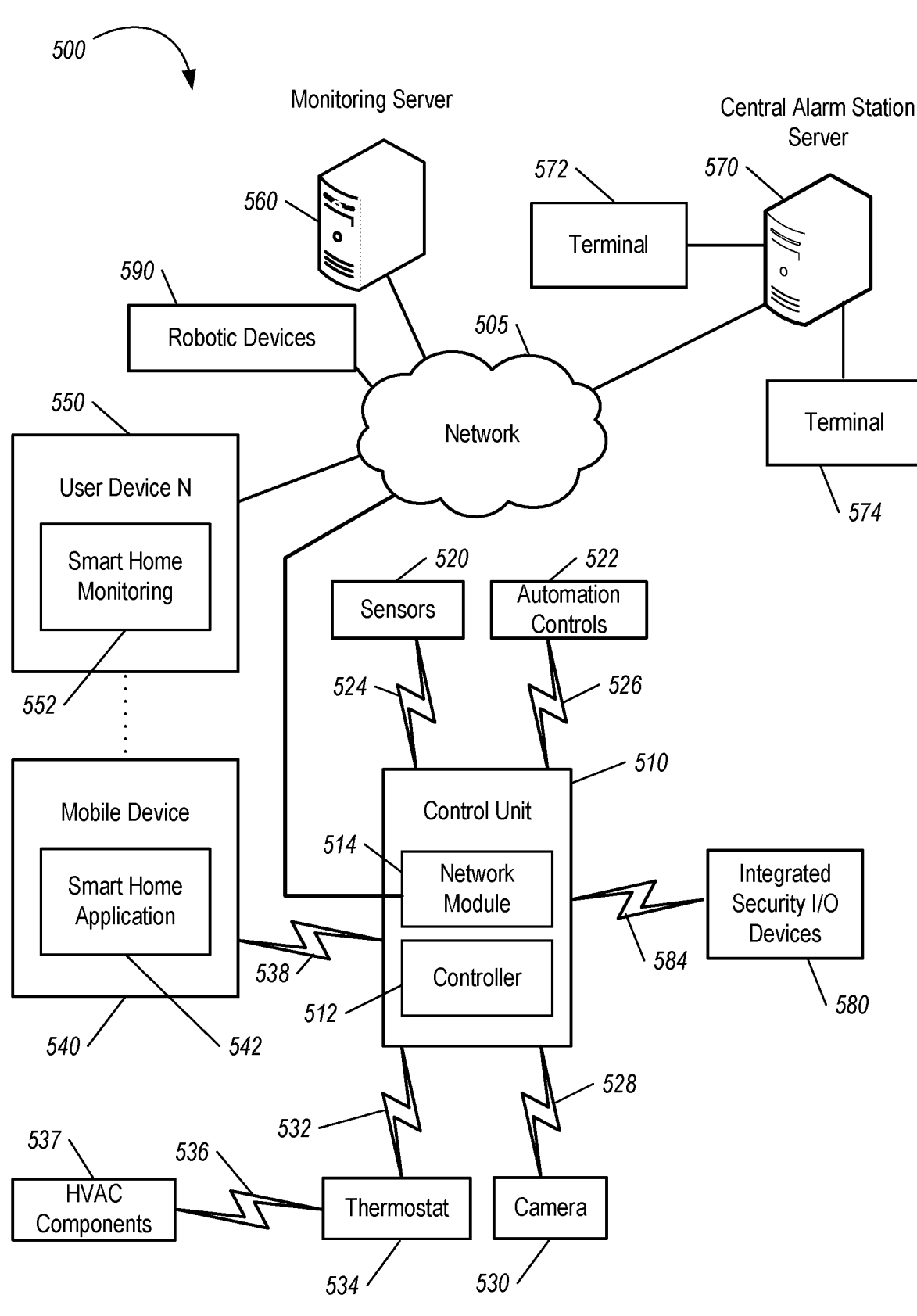
FIG. 5 is a block diagram of an example of a home monitoring system that may utilize various components to monitor water consumption devices.

FIG. 5 is a block diagram of an example of a home monitoring system 500 that may utilize various components to monitor water consumption devices. The home monitoring system 500 includes a network 505, a control unit server 510, one or more user devices 540 and 550, a monitoring application server 560, and a central alarm station server 570. In some examples, the network 505 facilitates communications between the control unit server 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit server 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit server 510 includes a controller 512 and a network module 514. The controller 512 is configured to control a system that includes the control unit server 510. In some examples, the controller 512 may include a processor or other control circuitry configured to execute instructions of a program that controls operation of a control unit system.

In these examples, the controller 512 may be configured to receive input from sensors, thermostats, or other devices included in the system and control operations of devices included in the monitored property (e.g., a showerhead, a faucet, a dishwasher, etc.). For example, the controller 512 may be configured to control operation of the network module 514 included in the control unit server 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit server 510 to communicate over a local area network and/or the Internet. The network module 514 also may be a voiceband modem configured to enable the alarm panel to communicate over the telephone lines of Plain Old Telephone Systems (POTS).

The control unit system that includes the control unit server 510 includes one or more sensors. For example, the monitoring system may include multiple sensors 520. The sensors 520 can include a water meter, e.g., the meter 110. The sensors 520 may include a temperature sensor, a humidity sensor, a leaking sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit server 510 communicates with the automation module 522 and the camera 530 to perform monitoring. The automation module 522 is connected to one or more devices that enable home automation control. For instance, the automation module 522 may be connected to one or more lighting systems and may be configured to control operation of the one or more lighting systems. Also, the automation module 522 may be connected to one or more electronic locks at the property and may be configured to control operation of the one or more electronic locks (e.g., control Z-Wave locks using wireless communications in the Z-Wave protocol). Further, the automation module 522 may be connected to one or more appliances at the property and may be configured to control operation of the one or more appliances. The automation module 522 may include multiple modules that are each specific to the type of device being controlled in an automated manner. The automation module 522 may control the one or more devices based on commands received from the control unit server 510. For instance, the automation module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a HVAC system monitored by the control unit server 510. The camera 530 may be configured to capture single, static images of the area and also video images of the area in which multiple images of the area are captured at a relatively high frequency (e.g., thirty images per second). The camera 530 may be controlled based on commands received from the control unit server 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit server 510. The camera 530 may employ a small solar cell to recharge the battery when sunlight is available. Alternatively, the camera 530 may be powered by the controller 512's power supply if the camera 530 is co-located with the controller 512.

In some implementations, the camera 530 communicates directly with the monitoring application server 560 over the Internet. In these implementations, image data captured by the camera 530 does not pass through the control unit server 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit server 510 and can control the environmental (e.g., temperature) settings based on commands received from the control unit server 510.

In some implementations, the thermostat 534 is a dynamically programmable thermostat and can be integrated with the control unit server 510. For example, the dynamically programmable thermostat 534 can include the control unit server 510, e.g., as an internal component to the dynamically programmable thermostat 534. In addition, the control unit server 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580. The system 500 additionally includes a meter 586. The meter 586 can include a device with multiple sensors that provide alerts to the control unit 510 based on the sensor data. The one or more control units 510 may additionally provide alerts or instructions to the meter 586. Additionally, the meter 586 may receive one or more sensor data from the sensors 520 and sensors within its housing to provide alerts to the control unit 510 and the monitoring application server 560. The meter 586 can monitor water usage and water consumption devices found in the monitored property.

The sensors 520, the module 522, the camera 530, the thermostat 534, the integrated security devices 580, and the meter 586 communicate with the controller 512 over communication links 524, 526, 528, 532, 584, and 588. The communication links 524, 526, 528, 532, 584, and 588 may be a wired or wireless data pathway configured to transmit signals from the sensors 520, the module 522, the camera 530, the thermostat 534, the integrated security devices 580, and the meter 586 to the controller 512. The sensors 520, the module 522, the camera 530, the thermostat 534, the integrated security devices 580, and the meter 586 may continuously transmit sensed values to the controller 512, periodically transmit sensed values to the controller 512, or transmit sensed values to the controller 512 in response to a change in a sensed value.

The communication links 524, 526, 528, 532, 584, and 588 may include a local network. The sensors 520, the module 522, the camera 530, the thermostat 534, the integrated security devices 580, the meter 586, and the controller 512 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CATS) or Category 5 (CAT6) wired Ethernet network. The local network may be a mesh network constructed based on the devices connected to the mesh network.

The monitoring application server 560 is an electronic device configured to provide monitoring services by exchanging electronic communications with the control unit server 510, the one or more user devices 540 and 550, and the central alarm station server 570 over the network 505. For example, the monitoring application server 560 may be configured to monitor events (e.g., alarm events) generated by the control unit server 510. In this example, the monitoring application server 560 may exchange electronic communications with the network module 514 included in the control unit server 510 to receive information regarding events (e.g., HVAC control events) detected by the control unit server 510. The monitoring application server 560 also may receive information regarding events (e.g., HVAC events) from the one or more user devices 540 and 550.

In some examples, the monitoring application server 560 may route HVAC data received from the network module 514 or the one or more user devices 540 and 550 to the central alarm station server 570. For example, the monitoring application server 560 may transmit the HVAC data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit server 510 or the one or more user devices 540 and 550.

The central alarm station server 570 is an electronic device configured to provide alarm monitoring service by exchanging communications with the control unit server 510, the one or more mobile devices 540 and 550, and the monitoring application server 560 over the network 505. For example, the central alarm station server 570 may be configured to monitor HVAC events generated by the control unit server 510. In this example, the central alarm station server 570 may exchange communications with the network module 514 included in the control unit server 510 to receive information regarding HVAC events detected by the control unit server 510. The central alarm station server 570 also may receive information regarding HVAC events from the one or more mobile devices 540 and 550 and/or the monitoring application server 560.

The central alarm station server 570 is connected to multiple terminals 572 and 574. The terminals 572 and 574 may be used by operators to process HVAC events. For example, the central alarm station server 570 may route HVAC data to the terminals 572 and 574 to enable an operator to process the HVAC data. The terminals 572 and 574 may include general-purpose computers (e.g., desktop personal computers, workstations, or laptop computers) that are configured to receive HVAC data from a server in the central alarm station server 570 and render a display of information based on the HVAC data. For instance, the controller 512 may control the network module 514 to transmit, to the central alarm station server 570, HVAC data indicating that a sensor 520 detected a flow rate of air in the air handling unit. The central alarm station server 570 may receive the HVAC data and route the HVAC data to the terminal 572 for processing by an operator associated with the terminal 572. The terminal 572 may render a display to the operator that includes information associated with the HVAC event (e.g., the flow rate, the air duct the flow rate came from, the temperature of the air in the air duct, etc.) and the operator may handle the HVAC event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit server 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit server 510 using the communication link 538. For instance, the one or more user devices 540 and 550 may communicate with the control unit server 510 using various local wireless protocols such as Wi-Fi, Bluetooth, Zwave, Zigbee, HomePlug (Ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit server 510, the one or more user devices 540 and 550 may communicate directly with the sensors and other devices controlled by the control unit server 510. In some implementations, the one or more user devices 540 and 550 replace the control unit server 510 and perform the functions of the control unit server 510 for local monitoring and long range/offsite communication.

In other implementations, the one or more user devices 540 and 550 receive monitoring system data captured by the control unit server 510 through the network 505. The one or more user devices 540, 550 may receive the data from the control unit server 510 through the network 505 or the monitoring application server 560 may relay data received from the control unit server 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit server 510 directly (e.g., through link 538) or through the monitoring application server 560 (e.g., through network 505) based on a location of the one or more user devices 540 and 550. For instance, when the one or more user devices 540 and 550 are located close to the control unit server 510 and in range to communicate directly with the control unit server 510, the one or more user devices 540 and 550 use direct communication. When the one or more user devices 540 and 550 are located far from the control unit server 510 and not in range to communicate directly with the control unit server 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, and the camera 530. The one or more user devices 540 and 550 receive data directly from the sensors 520, the module 522, and the camera 530 and send data directly to the sensors 520, the module 522, and the camera 530. The one or more user devices 540, 550 provide the appropriate interfaces/processing to provide visual surveillance and reporting.

In other implementations, the system 500 further includes network 505 and the sensors 520, the module 522, the camera 530, and the thermostat 534 are configured to communicate sensor and image data to the one or more user devices 540 and 550 over network 505 (e.g., the Internet, cellular network, etc.). In yet another implementation, the sensors 520, the module 522, the camera 530, and the thermostat 534 (or a component, such as a bridge/router) are intelligent enough to change the communication pathway from a direct local pathway when the one or more user devices 540 and 550 are in close physical proximity to the sensors 520, the module 522, the camera 530, and the thermostat 534 to a pathway over network 505 when the one or more user devices 540 and 550 are farther from the sensors 520, the module 522, the camera 530, and the thermostat 534. In some examples, the system leverages GPS information from the one or more user devices 540 and 550 to determine whether the one or more user devices 540 and 550 are close enough to the sensors 520, the module 522, the camera 530, and the thermostat 534 to use the direct local pathway or whether the one or more user devices 540 and 550 are far enough from the sensors 520, the module 522, the camera 530, and the thermostat 534 that the pathway over network 505 is required. In other examples, the system leverages status communications (e.g., pinging) between the one or more user devices 540 and 550 and the sensors 520, the module 522, the camera 530, and the thermostat 534 to determine whether communication using the direct local pathway is possible. If communication using the direct local pathway is possible, the one or more user devices 540 and 550 communicate with the sensors 520, the module 522, the camera 530, and the thermostat 534 using the direct local pathway. If communication using the direct local pathway is not possible, the one or more user devices 540 and 550 communicate with the sensors 520, the module 522, the camera 530, and the thermostat 534 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method for detecting a leak in an automatic refilling tank of a plumbing system, comprising:

obtaining, by at least one of one or more processors, water usage data representing quantities of water flow events occurring at respective frequencies within the plumbing system;

determining, by at least one of the one or more processors and using the water usage data, that a quantity of water flow events occurring at a particular frequency satisfies one or more water leak criteria; and in response to determining that the quantity of water flow events occurring at the particular frequency satisfies the one or more water leak criteria, determining, by at least one of the one or more processors, that a water leak exists in the automatic refilling tank.

2. The computer-implemented method of claim 1, wherein a water flow event comprises an event in which a water flow rate within the plumbing system satisfies a threshold water flow rate.

3. The computer-implemented method of claim 2, wherein a water flow event comprises an event in which the water flow rate within the plumbing system satisfies the threshold water flow rate for a time duration that satisfies a threshold time duration.

4. The computer-implemented method of claim 2, wherein a water flow event comprises an event in which the water flow rate within the plumbing system satisfies the threshold water flow rate for a time duration that exceeds a minimum threshold time duration and is less than a maximum threshold time duration.

5. The computer-implemented method of claim 1, wherein a start of a water flow event comprises a time when water usage measured by a water meter within the plumbing system rises above zero gallons per minute.

6. The computer-implemented method of claim 1, wherein:

the water usage data includes at least one frequency peak; and determining that the quantity of water flow events occurring at the particular frequency satisfies the one or more water leak criteria comprises determining that a magnitude of a frequency peak at the particular frequency exceeds a threshold magnitude.

7. The computer-implemented method of claim 1, wherein determining that the water leak exists in the automatic refilling tank further comprises determining, using the water usage data, that an average time between the start of sequential water flow events is less than a threshold time between the start of sequential water flow events.

8. The computer-implemented method of claim 1, wherein determining that the water leak exists in the automatic refilling tank further comprises determining, using the water usage data, that a periodicity of water flow events satisfies a threshold periodicity.

9. The computer-implemented method of claim 1, wherein:

the automatic refilling tank is one of a plurality of automatic refilling tanks of the plumbing system, each of the plurality of automatic refilling tanks having a respective refilling time duration; and determining that the water leak exists in the automatic refilling tank further comprises:

determining, using the water usage data, a duration of each of the water flow events occurring at the particular frequency; and determining that the duration of each of the water flow events occurring at the particular frequency corresponds with a refilling time duration of the automatic refilling tank.

10. The computer-implemented method of claim 1, comprising:

in response to determining that a water leak exists in the automatic refilling tank, transmitting, to a computing device, a notification that the water leak exists in the automatic refilling tank.

11. The computer-implemented method of claim 1, comprising:

in response to determining that a water leak exists in the automatic refilling tank, transmitting, to a water valve within the plumbing system, an instruction that causes the water valve to adjust position.

12. The computer-implemented method of claim 1, wherein the water usage data includes a frequency domain waveform.

13. The computer-implemented method of claim 1, wherein the automatic refilling tank comprises a toilet tank, a water heater, a boiler, a fountain, a pond, a pool, an aquarium, or a fire suppression system tank.

14. One or more non-transitory computer readable storage media storing instructions executable by a data processing apparatus and upon such execution cause the data processing apparatus to perform operations for detecting a leak in an automatic refilling tank of a plumbing system, the operations comprising:

obtaining water usage data representing quantities of water flow events occurring at respective frequencies within the plumbing system;

determining, using the water usage data, that a quantity of water flow events occurring at a particular frequency satisfies one or more water leak criteria; and in response to determining that the quantity of water flow events occurring at the particular frequency satisfies the one or more water leak criteria, determining, that a water leak exists in the automatic refilling tank.

15. The one or more non-transitory computer readable storage media of claim 14, wherein a water flow event comprises an event in which a water flow rate within the plumbing system satisfies a threshold water flow rate.

16. The one or more non-transitory computer readable storage media of claim 15, wherein a water flow event comprises an event in which the water flow rate within the plumbing system satisfies the threshold water flow rate for a time duration that satisfies a threshold time duration.

17. The one or more non-transitory computer readable storage media of claim 15, wherein a water flow event comprises an event in which the water flow rate within the plumbing system satisfies the threshold water flow rate for a time duration that exceeds a minimum threshold time duration and is less than a maximum threshold time duration.

18. The one or more non-transitory computer readable storage media of claim 14, wherein a start of a water flow event comprises a time when water usage measured by a water meter within the plumbing system rises above zero gallons per minute.

19. The one or more non-transitory computer readable storage media of claim 14, wherein:

the water usage data includes at least one frequency peak; and determining that the quantity of water flow events occurring at the particular frequency satisfies the one or more water leak criteria comprises determining that a magnitude of a frequency peak at the particular frequency exceeds a threshold magnitude.

20. A system comprising:

one or more computers; and one or more storage devices, the one or more storage devices storing instructions that, when executed by the one or more computers, cause the one or more computers to perform operations for detecting a leak in an automatic refilling tank of a plumbing system, the operations comprising:

obtaining, by at least one of the one or more computers, water usage data representing quantities of water flow events occurring at respective frequencies within the plumbing system;

determining, by at least one of the one or more computers and using the water usage data, that a quantity of water flow events occurring at a particular frequency satisfies one or more water leak criteria; and in response to determining that the quantity of water flow events occurring at the particular frequency satisfies the one or more water leak criteria, determining, by at least one of the one or more computers, that a water leak exists in the automatic refilling tank.

\* \* \* \* \*